US012330092B2

(12) United States Patent
Koslow

(10) Patent No.: US 12,330,092 B2
(45) Date of Patent: Jun. 17, 2025

(54) FILTER APPARATUS AND PROCESS FOR FILTRATION

(71) Applicant: Koslow Technologies Corporation, Waterbury, CT (US)

(72) Inventor: Jules Koslow, Waterbury, CT (US)

(73) Assignee: Koslow Technologies Corporation, Waterbury, CT (US)

(*) Notice: Subject to any disclaimer, the term of this patent is extended or adjusted under 35 U.S.C. 154(b) by 519 days.

(21) Appl. No.: 17/814,685

(22) Filed: Jul. 25, 2022

(65) Prior Publication Data
US 2023/0022132 A1 Jan. 26, 2023

Related U.S. Application Data

(60) Provisional application No. 63/225,748, filed on Jul. 26, 2021.

(51) Int. Cl.
B01D 29/085 (2006.01)

(52) U.S. Cl.
CPC ........ B01D 29/085 (2013.01); B01D 2201/40 (2013.01)

(58) Field of Classification Search
None
See application file for complete search history.

(56) References Cited

U.S. PATENT DOCUMENTS

| | | | | |
|---|---|---|---|---|
| 2,234,397 A * | 3/1941 | Bentz | ...................... | A47J 31/06 D7/400 |
| 3,861,975 A * | 1/1975 | Hauslein | ............... | A47J 31/446 156/227 |
| 4,560,475 A * | 12/1985 | Kataoka | ............. | B65D 85/8061 D23/209 |
| 5,059,325 A * | 10/1991 | Iida | ........................ | A47J 31/02 210/474 |
| 5,266,194 A * | 11/1993 | Chiodo | .................. | B01D 39/12 210/232 |
| 5,605,710 A * | 2/1997 | Pridonoff | ........... | B65D 85/8061 426/77 |
| 11,548,721 B2 * | 1/2023 | Fernandes De Carvalho | .............. | B65D 85/8061 |
| 2008/0011671 A1 * | 1/2008 | Syrkos | ................. | B01D 29/085 210/469 |
| 2021/0235918 A1 * | 8/2021 | Chen | ........................ | A23F 5/26 |
| 2023/0158344 A1 * | 5/2023 | Frerichs | ............. | B01D 46/0028 128/206.17 |

* cited by examiner

Primary Examiner — Krishnan S Menon
(74) Attorney, Agent, or Firm — Whitmyer IP Group LLC

(57) ABSTRACT

A modular structural device for assembling a funnel of a filtration apparatus including a base sheet having a polygonal shape. The base sheet having two sections connected by a hinge along a diagonal from a first corner of the base sheet to a second corner opposite the first corner, the second corner being substantially concave. The device having at least connector having a first part and a second part disposed on opposite sections of the base sheet along opposite edges adjacent to the concave corner. The first part of the connector comprising a projection that extends away from an upper surface of the base sheet. The second part of the connector comprising a depression in a lower surface of the base sheet. The first part of the connector of the modular structural device is configured to interlock with the second part of the connector of another modular structural device.

18 Claims, 8 Drawing Sheets

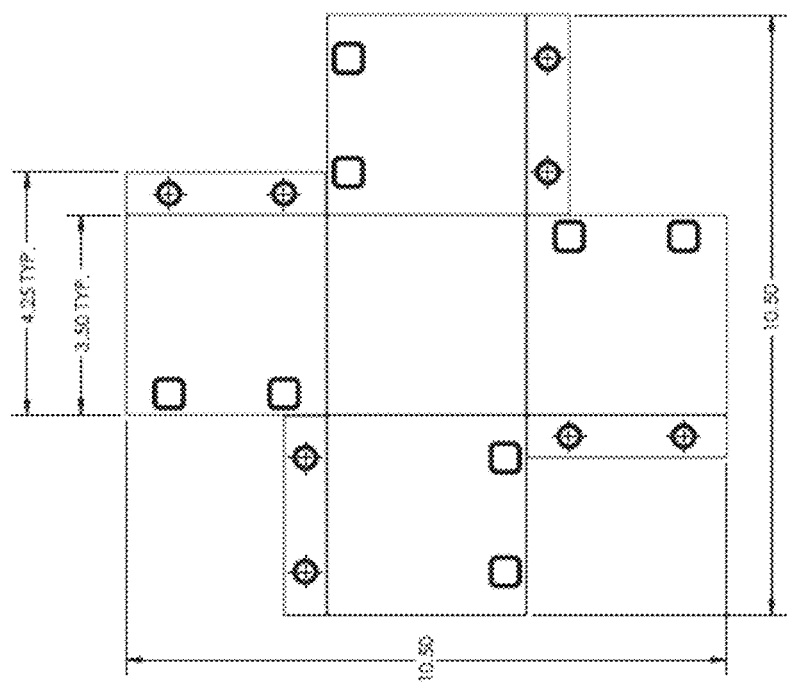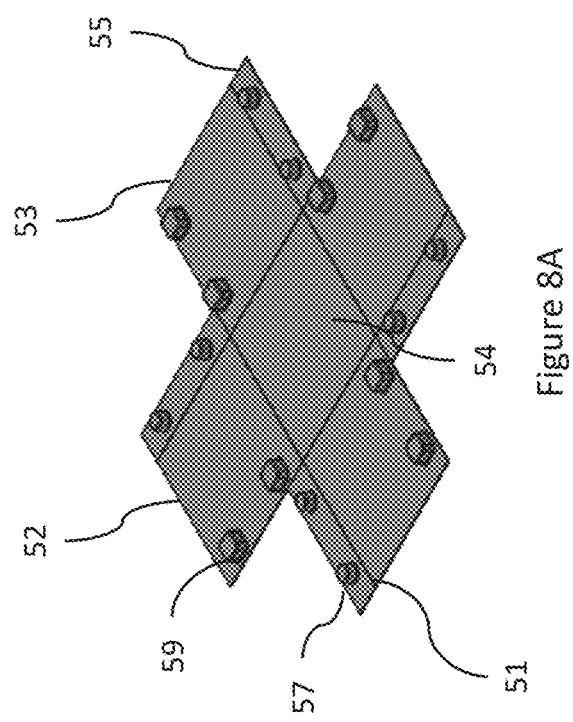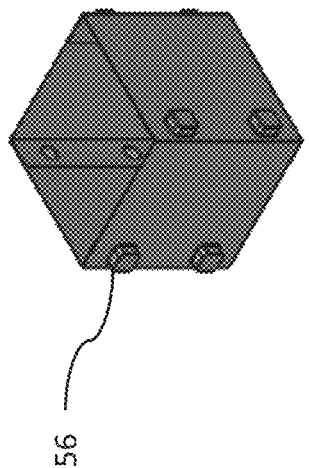
Figure 8A
Figure 8B
Figure 8C
Figure 8D

FILTER APPARATUS AND PROCESS FOR FILTRATION

CROSS-REFERENCE TO RELATED APPLICATIONS

This patent application claims the benefit, under 35 U.S.C. § 119(e), of U.S. Provisional Application Ser. No. 63/225,748, filed on Jul. 26, 2021 the contents of which are incorporated herein by reference in its entirety.

TECHNICAL FIELD

The present teachings herein generally relate to systems and methods for filtration. More specifically, the present teachings relate to a filtration apparatus with a funnel having a modular design.

BACKGROUND

Filter devices and filtration systems known in the art are material inefficient and provide suboptimal flow rate.

Producing highly purified water or carrying out filtration in a laboratory setting often involves passage of water, solvent, a suspension, or similar fluid through a suitable filter medium held in a funnel. In a laboratory setting, the most common approach is the use of a circular die-cut filter paper or membrane of varying size that is usually mounted to a Buchner funnel or a 45-degree funnel.

In the case of the Buchner funnel, the filter paper is laid flat onto the bottom surface of the funnel. The Buchner funnel provides no positive seal between the filter medium and the surface of the funnel. In many cases, the filter paper can easily lift off the surface of the funnel and permit contaminated fluid to pass through. In addition, these circular filters are usually die cut from rolls and sheets of filter medium, and this cutting process usually leaves 30-40% of the filter medium as scrap and trim. The Buchner funnels are often poorly designed because they provide very poor drainage of the filter medium. This means that when the filter paper is in direct contact with the funnel surface, the filter medium cannot drain, and a large portion of the filter paper is effectively inoperative. Only small drainage holes in the Buchner funnel provide limited drainage. If the funnel were provided a pattern of support with adequate drainage such as ribs, this often leads to a compromise on the integrity of the edge seal, which is accomplished by having the filter sit on a flat funnel surface.

In the case of the 45-degree funnel, the filter paper is usually folded in half, then folded again at a right angle to the original fold to form a rough triangle. This folded arrangement is then opened in such a manner to reveal a closed pocket with three layers of paper at one side of the filter and a single layer at the other side(s) of the filter arrangement. When fully opened, this pocket conforms to the surface of the 45-degree sloped funnel and has been used for centuries for laboratory solids-liquids separations. In this case, there is the usual scrap losses when cutting a circular disk of filter paper, but with this approach only 25% of the remaining filter paper is presented as a single layer of filter medium with efficient flow. The remainder is in the form of a three-layer stack, which has a disadvantageous flow resistance three time greater than that of the single layer. This results in a non-uniform flow through the filter paper with the majority of flow passing through the single layer side(s) and minimal flow passing through the three-layer stack side. Effectively, this arrangement wastes nearly 80-85% of the filter paper.

In some cases, the funnel supporting the filter medium itself is a problem. Most support funnels not only have a rigid shape that is bulky but have an elongated discharge stem that makes the funnel particularly unwieldy. Most laboratory funnels have no texture or ribs to promote drainage of the fluid emerging from the filter medium. If taken for camping or used by military personnel, these funnels would be totally unacceptable. Even in the laboratory environment, funnels take up a great deal of shelf space. Thus, there is a need for a funnel that can be collapsed to a flat structure for easy transport and storage (i.e., when not being used). There is also a need for a funnel that can fold to form an extremely compact structure.

Thus, there is a need for a filter apparatus that can make efficient use of a filter medium, provides a superior flow rate of liquids, has no critical seals and fully prevents a bypass of the filter medium during the filtration process.

SUMMARY

The needs set forth herein as well as further and other needs and advantages are addressed by the present embodiments, which illustrate solutions and advantages described below.

It is an object of the present teachings to remedy the above drawbacks and shortcomings associated with known filtration systems usually based on gravity-flow, but also sometimes using vacuum filtration or pressure.

It is an object of the present teachings to provide a filtration system or apparatus that is collapsible and easily transported and requires minimal space during storage.

It is an object of present teachings to provide a filtration system or apparatus that maximizes use of a filter medium, and preferably uses 100% of the filter medium.

It is an object of the present teachings to provide a filtration system or apparatus that is composed of modular pieces produced by high-speed slitting and sheeting processes rather than die cutting or clicker press machines.

It is an object of the present teachings to provide a filtration system or apparatus that uses a filter configuration where all or almost all of the filter medium is arranged as a single layer promoting uniform flow of fluid therethrough.

It is an object of the present teachings to provide a filtration system or apparatus that includes a funnel with minimal to no leakage paths and/or critical seals, thereby preventing any bypass of the filter medium during a filtration process.

It is an object of the present teachings to provide a filtration system where a filter medium and a funnel are optimally folded in the same manner from flat-sheet components of nearly the same size and shape such that a compact kit consisting of the funnel and the filter medium can be created to promote easy transport and deployment in emergency, camping, military, and other similar situations.

It is an object of the present teachings is to provide a filtration system which is optimal for many applications including laboratory-scale separations, as well as means for producing highly purified drinking water.

It is an object of the present teachings to provide a filtration system which is scalable to handle larger volumes of fluid, faster flow rates, and/or higher contaminant loading capacity, and meet a wider range of applications, while being collapsible to either a compact flat shape or even a compact folded shape suitable for transport by users (e.g., hikers, soldiers, first responders), for use in emergencies, or in military applications for field expedient water purification.

The system uses unique modular pieces to create a flatpack that may be assembled into a funnel having drainage and/or filter material advantages over traditional funnels.

These and other objects of the present teachings are achieved by providing a modular structural device for assembling a funnel of a filtration apparatus, including a base sheet having a polygonal shape. The base sheet having two sections connected by a hinge extending along a diagonal from a first corner of the base sheet to a second corner opposite the first corner, the second corner being substantially concave, the first section being foldable towards the second section along the hinge. The device also includes at least one connector having a first part and a second part. The first part of the connector disposed on the first section of the base sheet along a first edge adjacent to the concave corner, the first part of the connector comprising a projection that extends away from an upper surface of the base sheet. The second part of the connector disposed on the second section of the base sheet along a second edge adjacent to the second corner, the second part of the connector comprising a depression in a lower surface of the base sheet. The first part of the connector of the modular structural device is configured to releasably engage the second part of the connector of a second base sheet.

The present teachings provide a filtration apparatus which includes a funnel having a plurality of base sheets releasably connected to each other, each base sheet having a polygonal shape. Each base sheet includes two sections connected by a hinge extending along a diagonal from a first corner of the base sheet to a second corner opposite the first corner, the second corner being substantially concave, the first section being foldable towards the second section along the hinge. Each base sheet includes at least one connector having a first part and a second part. The first part of the connector disposed on the first section of the base sheet along a first edge adjacent to the second corner, the first part of the connector comprising a projection that extends away from an upper surface of the base sheet and the second part of the connector disposed on the second section of the base sheet along a second edge adjacent to the concave corner, the second part of the connector comprising a depression in a lower surface of the base sheet. Each base sheet is bent along the hinge and the first part of the connector of each base sheet is configured to releasably engage the second part of the connector of another base sheet such that the plurality of base sheets forms a funnel-shape, and the concave corners are disposed adjacent to each other to form an opening.

The present teachings also provide a filtration system which includes a plurality of base sheets having a polygonal shape. Each base sheet includes two sections connected by a hinge extending along a diagonal from a first corner of the base sheet to a second corner opposite the first corner, the second corner being substantially concave, the first section being foldable towards the second section along the hinge. Each base sheet includes at least one connector having a first part and a second part. the first part of the connector disposed on the first section of the base sheet along a first edge adjacent to the second corner, the first part of the connector comprising a projection that extends away from an upper surface of the base sheet and at least one second part of the connector disposed on the second section of the base sheet along a second edge adjacent to the concave corner, the second part of the connector comprising a depression in a lower surface of the base sheets. The system also includes a filter having a planar form that is foldable into a configuration having the funnel-shape is received in the funnel such that the filter is arranged against the upper surfaces of the base sheets, which are releasably connected to each other. The upper surface of each base sheet has a series of parallel protuberances oriented at an angle relative to the hinge configured to direct the flow of material in the filtration apparatus. Each base sheet is bent along the hinge and the first part of the connector of each base sheet is configured to releasably engage the second part of the connector of another base sheet such that the plurality of base sheets forms a funnel-shape and the concave corners are disposed adjacent to each other to form an opening.

The present teachings further provide a folding cup apparatus which includes a base sheet having a polygonal shape. A plurality of walls, each wall being connected to an edge of the base sheet by a first hinge extending along a first edge of the respective wall. Each wall has at least one connector having a first part and a second part. The first part of the connector disposed along a second edge adjacent to the base sheet and a tab connected to a third edge of the wall by a second hinge, the third edge being opposite the second edge. The tab has the second part of the connector disposed thereon. Each wall is configured to bend towards at least one of the other walls along the first hinge and the tab of each wall is configured to bend along the respective second hinge such that the first part of the connector of each wall releasably connects to the second part of the connector of one of the other walls adjacent thereto.

The present teachings provide a filtration system including a base sheet having a plurality of sections, where each section is separated from at least one other of the sections by a juncture. Each section also has two subsections connected by a hinge extending along a diagonal from a first corner of the section to a second corner opposite the first corner, the second corner being substantially concave, the first subsection being foldable towards the second subsection along the hinge. The system also includes a connector having a first part and a corresponding second part. The first part of the connector is attached to one of the sections and the second part of the connector is attached to another one of the sections. The first part of the connector is configured to releasably engage the second part of the connector such that the base sheet is bent along the hinges forming a funnel-shape and the concave corners are disposed adjacent to each other to form an opening.

Other features and aspects of the present teachings will become apparent from the following detailed description, taken in conjunction with the accompanying drawings, which illustrate by way of example the features in accordance with embodiments of the present teachings. The summary is not intended to limit the scope of the present teachings.

BRIEF DESCRIPTION OF THE DRAWINGS

FIGS. 8A-8D is a schematic diagram of a folding cup according to the present teachings.

DETAILED DESCRIPTION

The present teachings are described more fully hereinafter with reference to the accompanying drawings, in which the present embodiments are shown. The following description is presented for illustrative purposes only, and the present teachings should not be limited to these embodiments.

The present teachings have been described in language more or less specific as to structural and mechanical features. It is to be understood, however, that the present teachings are not limited to the specific features shown and described, since the device, apparatus, and/or system herein disclosed comprises preferred forms of putting the present teachings into effect.

For purposes of explanation and not limitation, specific details are set forth such as particular structures, architectures, interfaces, techniques, etc. in order to provide a thorough understanding. In other instances, detailed descriptions of well-known devices and/or methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

Figure 1:
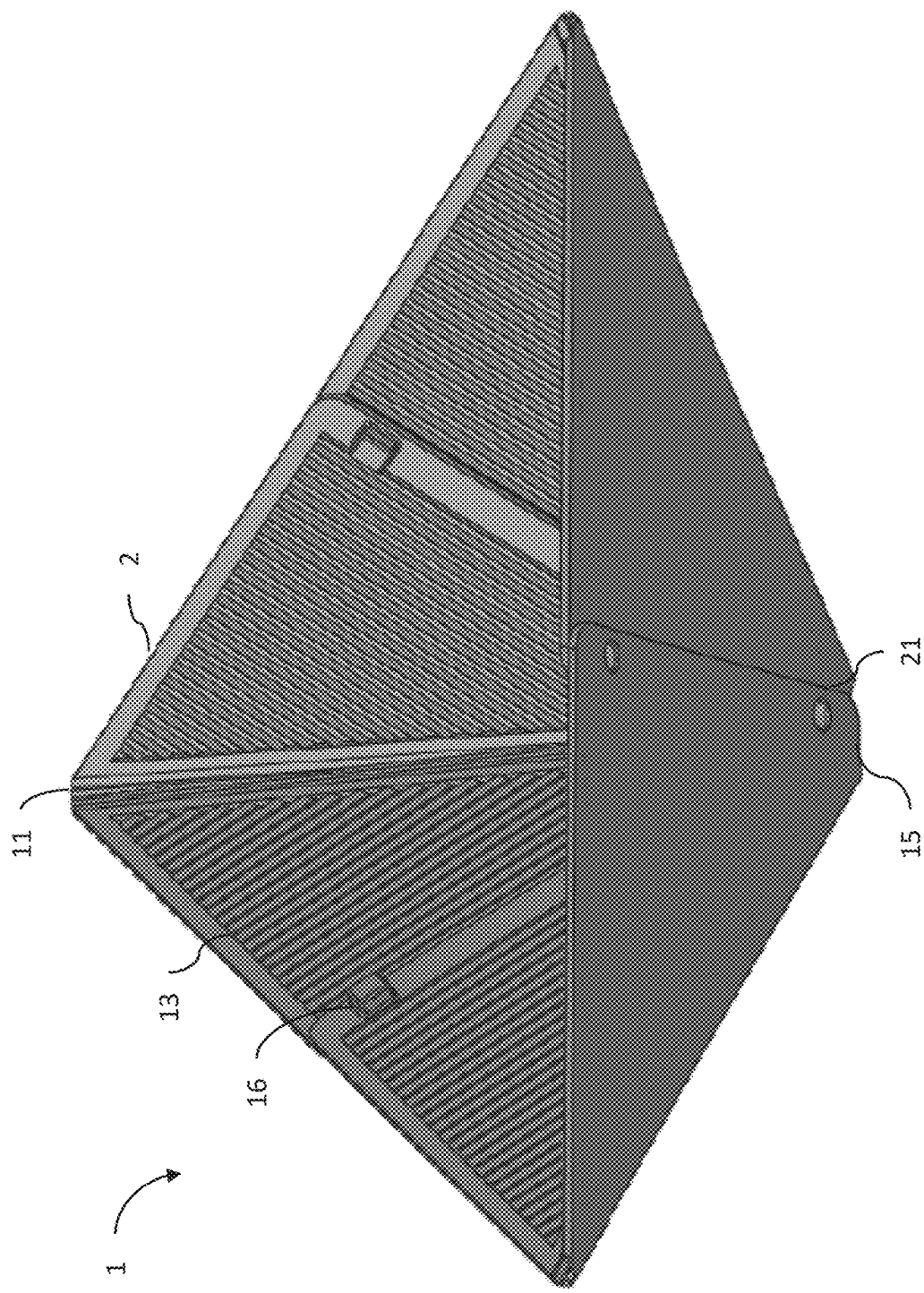
FIG. 1 is a schematic diagram depicting an assembled filter funnel according to the present teachings.

FIG. 1 shows one embodiment of a filtration system or apparatus, and more specifically a funnel assembly, according to the present teachings.

The funnel assembly 1 may be made of one or more modular funnel pieces or units 2. In a preferred embodiment the funnel assembly 1 may be made of three funnel pieces 2. Depending on the shape and configuration of the funnel pieces 2, more or less funnel pieces 2 may be used to form the funnel assembly 1.

In one embodiment the funnel assembly 1 may have an angle of 45° mimicking that of a traditional 45-degree funnel. In a preferred embodiment the funnel assembly 1 may have an angle between 30° and 45°. The angle of the funnel assembly 1 may be less than 30° or greater than 45° depending on desired use.

The funnel piece 2 may be bent along a hinge 11 and connected by a locking button 16 forming the funnel assembly 1. The locking buttons 16 may all face the same or opposite directions. The drainage point 15 from each funnel piece 2 may align forming a single point on the funnel assembly where liquids may drain from.

The funnel assembly 1 may have an exposed edge 21 where two or more funnel pieces 2 meet. The exposed edge 21 may be secured using an impulsive seam, sonic weld, adhesive, or other means of holding the funnel pieces 2 together.

Figure 2:
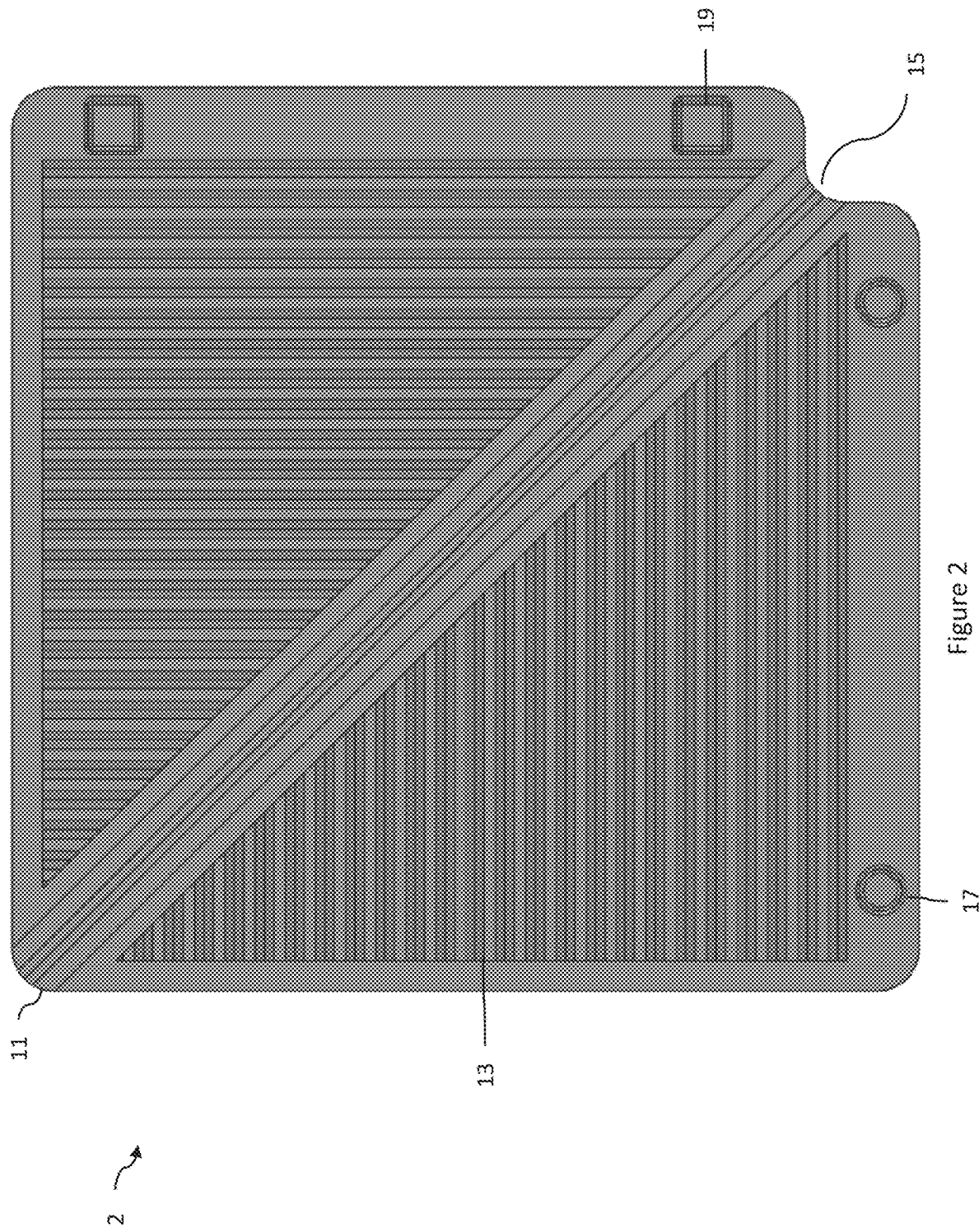
FIG. 2 is a schematic diagram depicting a flat, modular frame unit for assembling the filter funnel according to the present teachings.

Referring to FIG. 2, shown is one embodiment of a flat sheet filter funnel piece according to the present teachings.

The flat sheet funnel piece may be modular components that may be assembled into a funnel or other shape.

The flat sheet funnel piece 2 may be a polygonal shape. In a preferred embodiment the funnel piece 2 may be a square or a substantially square shape. In a further preferred embodiment, the funnel assembly 1 may be made of three, square funnel pieces 2 resulting in a substantially flat area at the mouth of the funnel assembly 1.

In another embodiment the funnel piece 2 may be a polygon having more than four side resulting in a non-uniform mouth of the funnel assemble. This may be preferable where objects need to be positioned to rest or hang on the non-uniform surface in or over the funnel (i.e., in an experiment or laboratory setting).

The shape of the funnel piece 2 may affect the number of pieces used to form the funnel assembly 1, the geometry of the funnel assembly 1 including the angle, cross section and mouth of the funnel, and the flow rate through the funnel assembly 1. Depending on the desired specifications and use of the resulting funnel assembly 1 the funnel piece 2 may be any geometric shape to meet those needs.

The size of the funnel piece 2 may change depending on the application. For example, the funnel piece 2 may be larger for group uses (i.e., a family camp site, a disaster relief first aid center) or may be smaller for personal use (i.e., a hiker, a soldier). The funnel pieces 2 may be different sizes and may be modular such that multiple smaller pieces are assembled to form a larger piece and may be assembled with one or more larger pieces or multiple smaller pieces into a multilayered funnel.

The funnel piece 2 may be made of polyolefin (polypropylene), polyester resin such as PET, waterproof paper, sheets of metal, or any other material that can be bent and folded to create a supportive funnel of the desired shape. In one embodiment the funnel piece 2 may be thermoformed or injection molded plastic.

The funnel piece 2 may have a hinge 11. The hinge 11 may be a series of preformed bends, ridges and/or creases in the material, perforations, a region of reduced thickness, or other means to facilitate folding of the funnel piece 2. The performed bends, ridges and/or creases may be parallel to each other and run the length of the hinge 11.

The hinge 11 may be diagonal across the funnel piece 2. The hinge 11 may connect two corners of the funnel piece 2 separating the funnel piece into two pieces. In a preferred embodiment the funnel piece 2 is square or substantially square and the hinge 11 runs from one corner diagonally to an opposite corner of the funnel piece 2 creating two triangular pieces connected by the hinge 11.

In a preferred embodiment the hinge 11 may be a "living hinge" where the alignment of the polymer molecule in the region of the hinge 11 is oriented across the hinge, enhancing the resistance to stress cracking.

The funnel piece 2 may have a textured surface 13. The textured surface 13 may be ribs, small dots, or other protuberances on the funnel piece that limit the amount of supporting surface in contact with a filter medium. The protuberances may limit the contact of a filter medium with the surface of the funnel allowing for a higher and/or more uniform flow rate. A liquid may pass through and flow under the filter medium through the space between the filter medium and the surface of the funnel created by the textured surface 13.

The textured surface 13 may be angled as to direct the flow of filtered liquids. The textured surface 13 may be angled towards the hinge 11, the drainage point 15, horizontally, vertically, or in any other direction to direct the flow of filtered liquids.

In a preferred embodiment the textured surface 13 may be a series of shallow ribs which hold the filter medium away from the surface of the funnel and may also enhance material flow during the production process (for example flow of filter material into a production mold). In a further preferred embodiment, the textured surface 13 may be ribs, in this embodiment the textured surface 13 may support flow rates through a filter medium that are at least 100% higher compared to a funnel without a textured surface 13.

The funnel piece 2 may have a drainage point 15. The drainage point 15 may be a concave, substantially concave, or liner cut portion of the funnel piece 2 such that when assembled into a funnel would allow for liquids to drain out. The drainage point 15 may be located at one end of the hinge 11.

For example, the corners of the funnel piece 2 may be convex or substantially convex except for one corner, the drainage point 15, being concave. Any number of the corners of the funnel piece may be concave or convex so long as at least one corner being the drainage point 15 is concave, substantially concave, linear cut, or any other configuration such that when assembled the filtration system allows for liquids to drain out.

The corners of the funnel piece 2 may be linear, chamfered, beveled, filleted or other edge blends.

The edges of the funnel piece 2 may be linear, chamfered, beveled, filleted or other edge blends.

The funnel piece 2 may have a male connector 17 and a female connector 19 forming corresponding pieces of the locking button 16. The male connector 17 and the female connector 19 may be located on adjacent edges of the funnel piece 2 separated by the hinge 11. The funnel piece 2 may have a corresponding male connector 17 and female connector 19 on the adjacent edges such that multiple funnel piece 2 may be tiled together to form a funnel or other desired shape.

The male connector 17 may extend away from the funnel assembly 1 such that the locking button 16 does not interfere with the filter medium. The male connector 17 may be any size and/or shape capable of forming a locking button 16 with the female connector 19. In one embodiment the male connector 17 may have a circular cross section.

The female connector 19 may extend away from the funnel assembly 1 such that the locking button 16 does not interfere with the filter medium. The female connector 19 may be any size and/or shape capable of forming a locking button 16 with the male connector 17. In one embodiment the female connector 19 may have a linear sided cross section. In a preferred embodiment the female connector 19 may have a square cross section.

In a preferred embodiment there may be two male connectors 17 on one edge and two corresponding female connectors 19 on an adjacent edge which may form a locking button 16 between multiple funnel pieces 2. However, it is understood that male connectors 17 and female connectors 19 and the locking buttons 16 they form may be positioned in a variety of configurations and there may be any number of corresponding connectors as needed to secure the funnel pieces 2 to each other.

It is understood that the male connector 17, the female connector 19 and the locking button 16 may be replaced with any means of connecting the funnel assembly 1 and/or funnel piece 2 to themselves, each other, or other pieces of a filtration apparatus disclosed above or herein.

Figure 3:
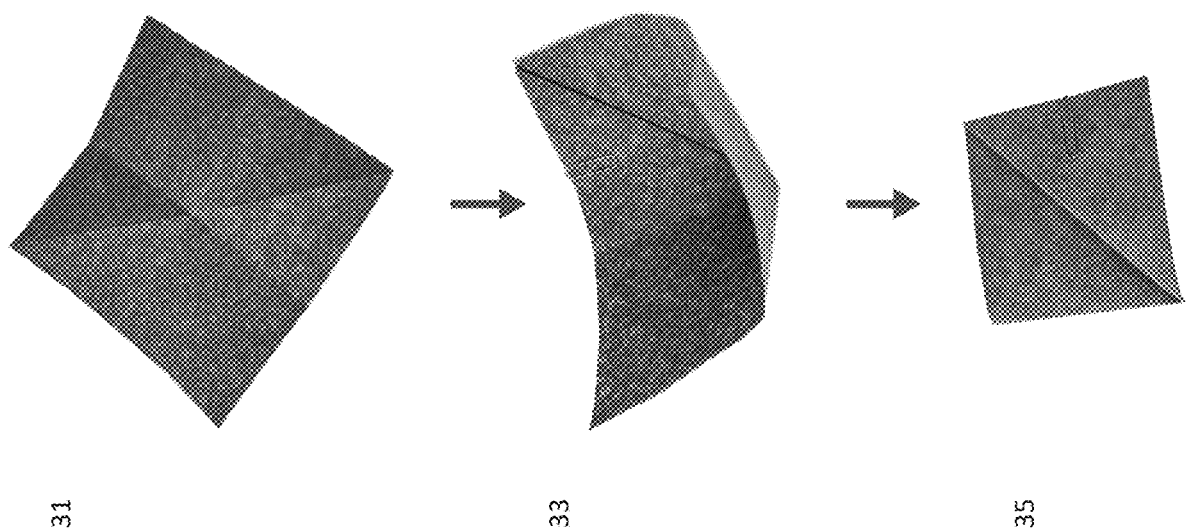
FIG. 3 is a flow diagram depicting a filter medium according to the present teachings.

Referring now to FIG. 3, shown is one embodiment of a filter medium and a method for folding the filter medium and compact storage according to the present teachings.

In one embodiment the filter medium 31 may be a square having pre-creased folds allowing the filter medium 31 to be folded into a shallow funnel shape 33.

In one embodiment, the shallow funnel shape 33 may be made up of six regions whereby only one the regions form a triple stack of the filter medium. In this embodiment, losses of valuable filter medium 31 may be avoided through the use of a square piece of filter medium 31 that is slit and sheeted to size with minimal trim losses. Additionally, in this embodiment, the shallow funnel shape 33 may present the majority (approximately 84%) of the filter medium 31 as a single layer with high flow and solids holding capacity. The shallow funnel shape 33 may also permit the pressure applied to the filter medium 31 to be more uniform than in a traditional folded filter that has a steep angle and produced from a circular piece of filter paper. The result may be a nearly five-times greater amount of filter medium 31 being made available for filtration compared to the use of a circular piece that is held in a conventional steep-angle funnel.

The shallow funnel shape 33 may be held together by a paperclip, clamp or other means of adhering the filter medium 31 to itself. The adherence and adhesive used may be temporary or permanent. In one embodiment the shallow funnel 33 may be held together by the weight of the filter liquid and the means for adhering the filter medium may be obviated.

The shallow funnel shape 33 may be further folded into a compact shape 35. The compact shape 35 may be one quarter the size of the filter medium 31.

Figure 4:
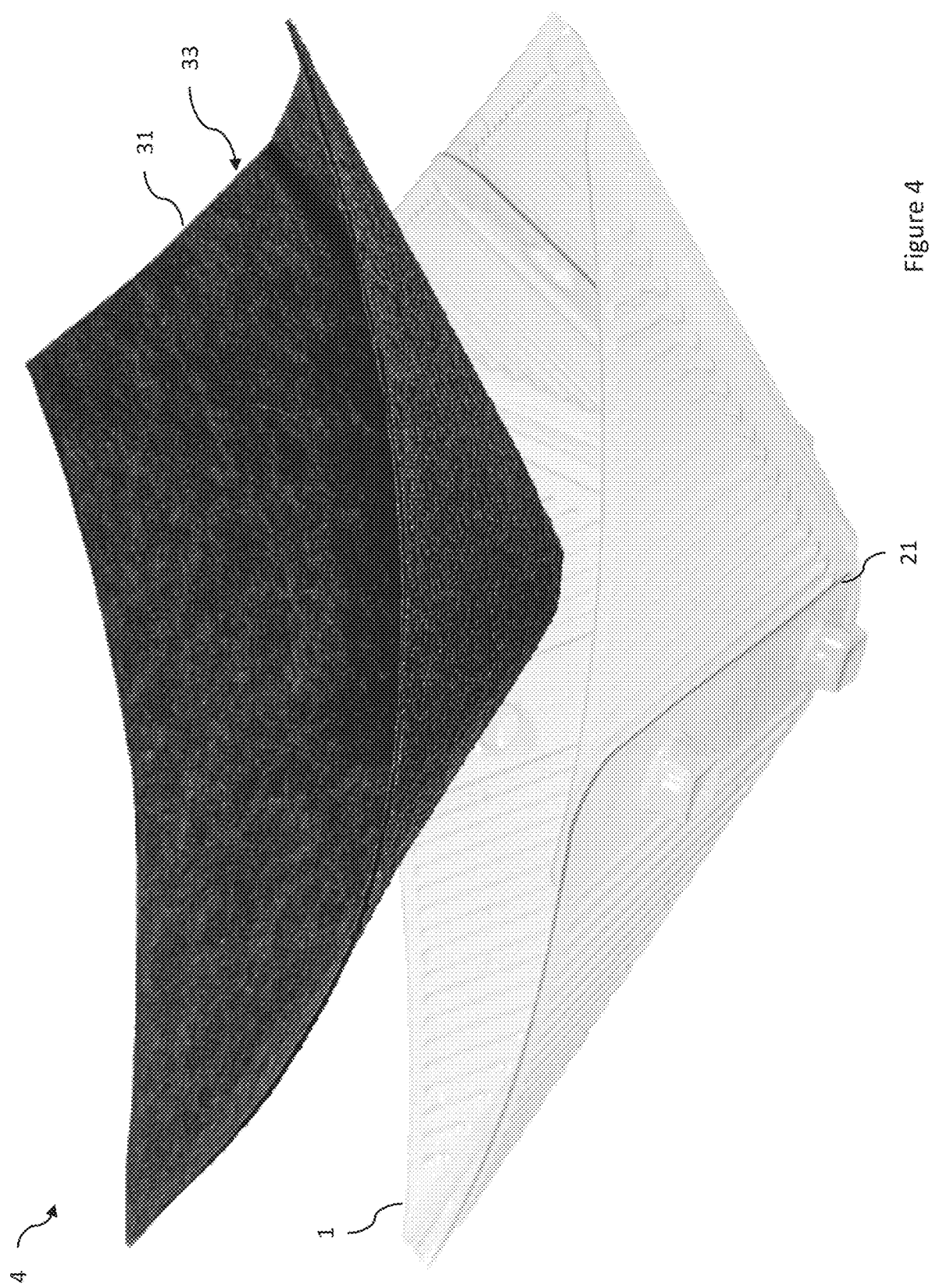
FIG. 4 is an illustration of a funnel and filter system according to the present teachings.

Referring now to FIG. 4 showing is one embodiment for a system for filtration according to the present teachings.

The system for filtration 4 may have a funnel assembly 1 and a filter medium 31 in a shallow funnel shape 33. The funnel assembly 1 may be the same shape as the filter medium 31.

For example, the filter medium 31 may be a solid piece of material with no edges submerged within the fluid, so long as the user does not add fluid such that it overflows the edge of the funnel assembly 1, the fluid is fully confined and will be subject to complete and secure filtration. There are no means for the fluid to bypass the system 4 except in the event of over-filling of the funnel.

In one embodiment the filter medium 31 may be manufactured to be stiff even when wet and be able to support itself thereby eliminating the need for a funnel assembly 1. In another embodiment the weight of the fluid to be filtered may be significant and the filter medium 41 is supported by the funnel assembly 1.

In one embodiment, the filter medium 31 may be more than one layer to promote either graded density filtration (consisting of progressively finer filtration of particulates), pre-filtration of bulk particulates or chemical components within the fluid, or to provide increased adsorptive capacity for the reduction of chemical components within the fluid. The layers of filter medium 31 may, therefore, consist of multiple layers of the same filter medium or of various combinations of different filter media to accomplish enhanced fluid purification or component separation, or to achieve longer life of the filter combination when handling fluids containing greater volumes of contaminants or ingredients being separated from the fluid.

In a preferred embodiment the funnel assembly 1 and the filter medium 31 in the system 4 may be formed and folded in the same manner, permitting all the components to be folded into a very compact package. For example, a roughly 10" diameter funnel assembly 1 may be broken down into multiple funnel pieces 2 and filter medium 31 can be folded into a 5"×5" compact shape 35 that is only 0.5" in height.

Referring now to the filter medium 31, a 10"×10" piece of filter medium 31 may consist of electrokinetic nanofiber composite, consisting of a filter paper that is 30% fiber and 70% adsorbent particles (by weight) and 0.030" in thickness can be used to sterilize water in accordance with NSF P231 (reducing bacteria, virus, and parasites); reduce all listed herbicides, pesticides, pharmaceuticals and industrial chemicals in accordance with NSF STD 401; reduce toxic metals such as lead, mercury, cadmium and antimony as well as asbestos in accordance with NSF STD 53; and reduce chlorine, chloramines, sulfides and particulates in accordance with NSF STD 42 while providing NSF STD 42 Class 1 (0.5 micron) filtration of particulates and turbidity. Flow rate for such a filter may be 50-75 ml/minute resulting in the production of a standard 500 ml bottle of purified water in 7-10 minutes. The filter may continue to meet all of these performance criteria for 700 liters under the above-listed ANSI/NSF International protocols and standards.

Persons having ordinary skill in the art will appreciate that a variety of different filter folds may result in filters with shallower or steeper angles compared to the examples described above and herein, but the advantages of this approach remain. These advantages may include an enormous reduction in filter paper trim losses by using a square (or rectangular) filter sheet and improved presentation of the filter paper during filtration with the majority presented as a uniform single layer of filter medium. The plastic filter funnel and the filter medium may be laid flat or folded into a compact structure that is rugged and convenient. The filter funnel and filter medium may both snap into their funnel shape with ease and can discharge purified fluid to any suitable container. The flow rate through this arrangement may be enormously improved and the uniformity of the flow will ensure that the filter medium is efficiently utilized with maximum particulate holding capacity.

Figure 5:
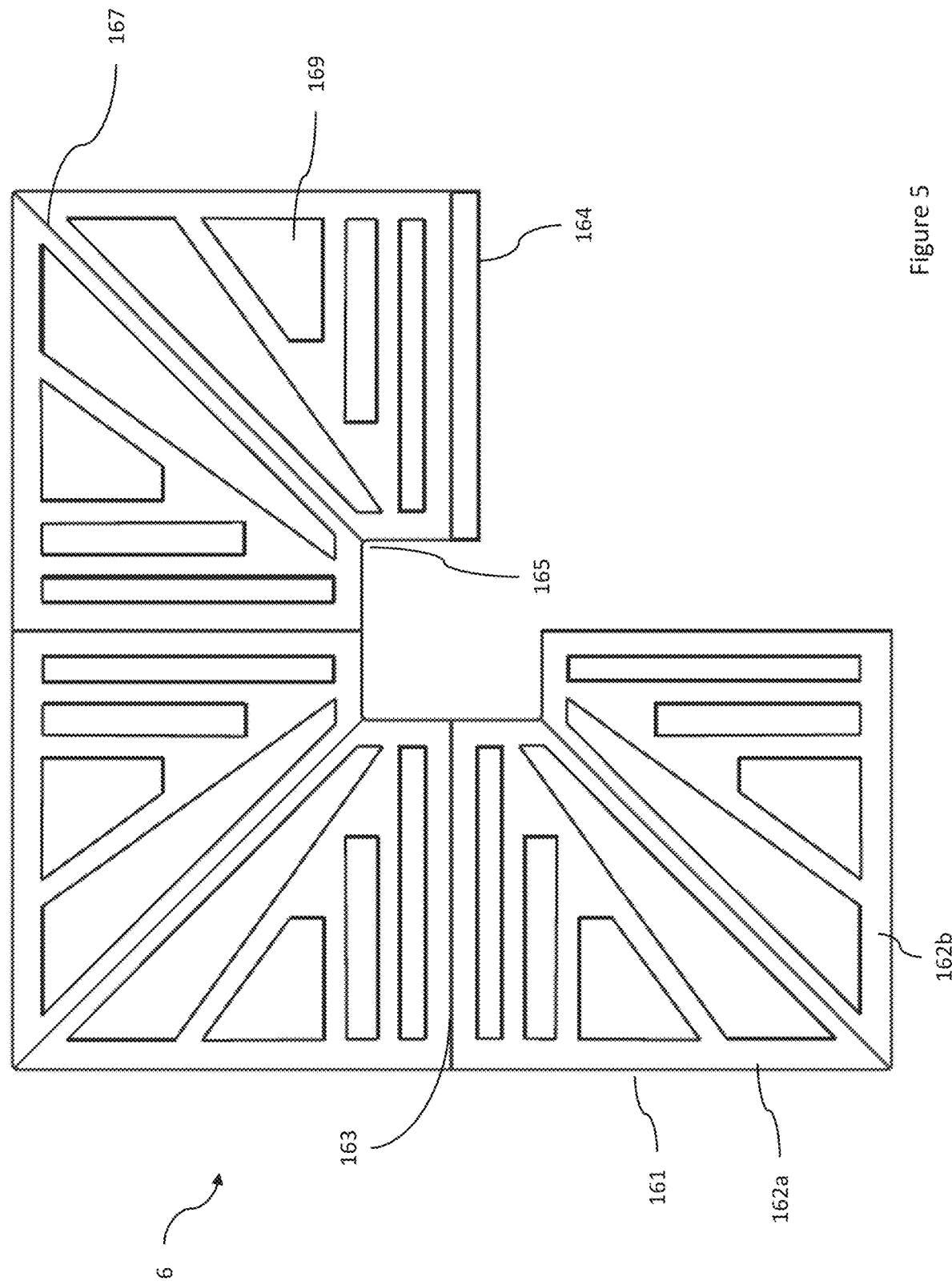
FIG. 5 is a schematic diagram of a flat frame unit for assembling the filter funnel according to the present teachings.
Figure 6:
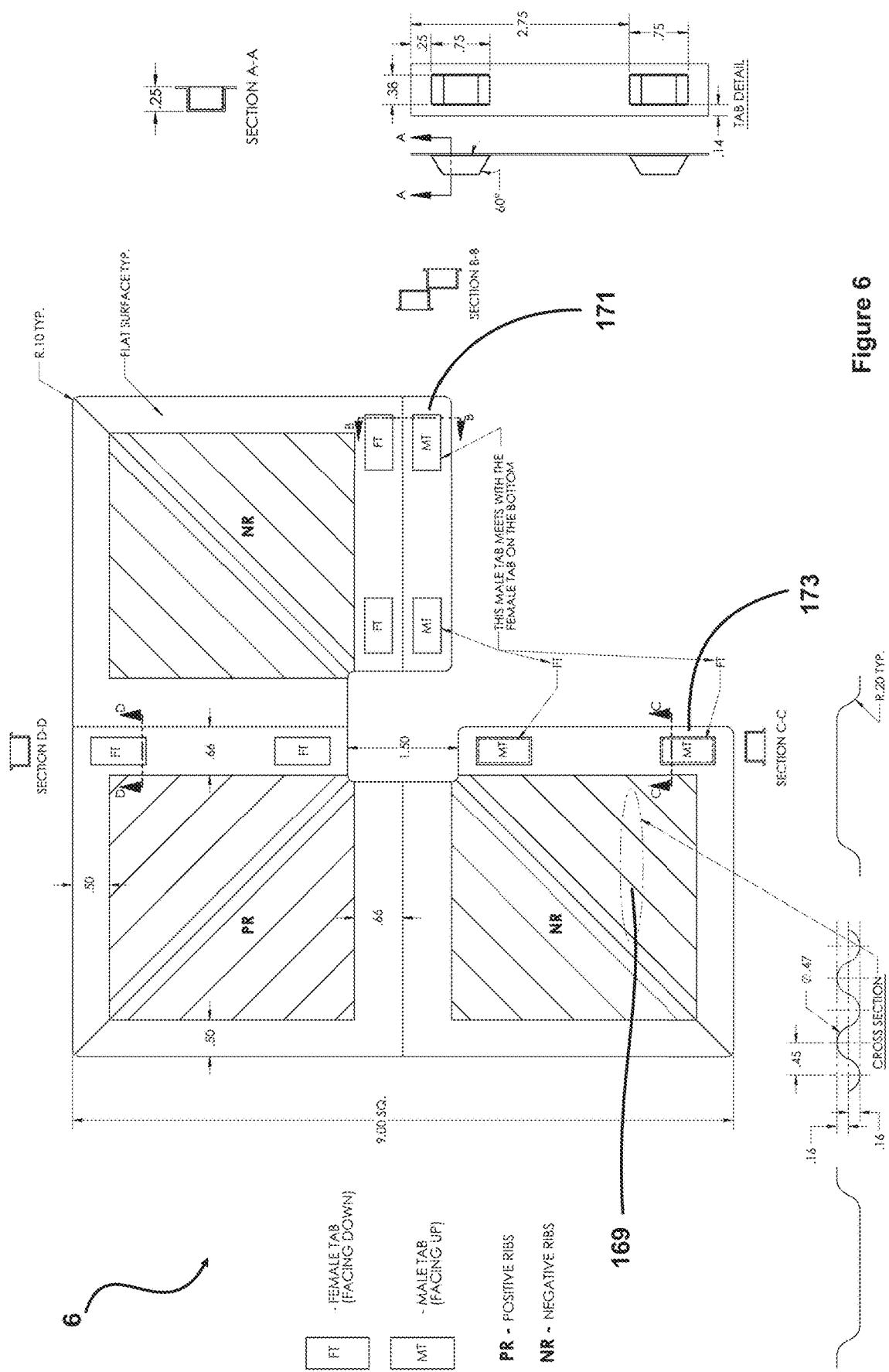
FIG. 6 is a detailed schematic view, with cross-sectional views, of a flat frame unit for assembling the filter funnel according to the present teachings.

FIGS. 5 and 6 show an alternate embodiment of a filtration system or apparatus, and more specifically an assembly unit formed from one sheet according to the present teachings.

The assembly sheet 6 may be made of a plurality of sections 161. The sections 161 may be made of polyolefin (polypropylene), polyester resin such as PET, waterproof paper, sheets of metal, or any other material that can be bent and/or folded to create a supportive funnel of the desired shape. In one embodiment, the assembly sheet 6 may be thermoformed or injection molded plastic. Each section 161 may be attached to an adjacent section 161 by a juncture 163. At least one of the sections 161 may also have a tab 164 connected by a juncture 163.

The juncture 163 may be a rigid union of the sections 161 or it may be a flexible union, such as a hinge. The juncture 163 may secure the sections 161, impulse weld, sonic weld, hot melt glue or other similar means or may be a series of preformed bends, ridges and/or creases in the material, perforations, a region of reduced thickness, or other means to facilitate folding along the juncture 163.

In one embodiment, the assembly sheet 6 may be a polygon. In a preferred embodiment, the assembly sheet 6 may be in configured in an L shape.

Each section 161 may be made of subsections 162a, 162b. In a preferred embodiment, each section 161 may have a first subsection 162a and a second subsection 162b. The subsections 162a, 162b may be connected by a hinge 167.

In a preferred embodiment, the assembly sheet 6 may be formed by three sections 161, each of which comprises two subsections 162a, 162b. The subsections 162a, 162b may be substantially triangular.

The hinge 167 may be a series of preformed bends, ridges and/or creases in the material, a region of reduced thickness, or other means to facilitate folding of the sections 161. The performed bends, ridges and/or creases may be parallel to each other and run the length of the hinge 163. Alternatively, the hinge 167 may a single preformed bend, ridge and/or crease in the material.

In a preferred embodiment, the hinge 167 may be a "living hinge" where the alignment of the polymer molecule in the region of the hinge 167 is oriented across the hinge, enhancing the resistance to stress cracking.

The hinge 167 may be diagonal across the section 161. The hinge 167 may connect two corners of the section 161 separating the first subsection 162a and the second subsection 162b.

The sections 161 may have a drainage point 165, the drainage point 165 may be concave, substantially concave, or linear cut portion of the section 161. The drainage point 165 may be located at one end of the hinge 167.

The corners of the section 161 may be convex or substantially convex except for one corner, i.e., at the drainage point 165, being concave. Any number of the corners of the sections 161 may be concave or convex so long as at least one corner being the drainage point 165 is concave, substantially, concave, linear cut, or any other configuration such that when assembled the filtration system allows for liquids to drain out.

The sections 161 may have a textured surface 169. The textured surface 169 may be ribs, small dots, or other protuberances in the section 161 that limit the amount of supporting surface in contact with a filter medium. The protuberances may limit the contact of a filter medium with the surface of the section 161 allowing for a higher and/or more uniform flow rate. A liquid may pass through and flow under the filter medium through the space between the filter medium and the surface of the section 161 created by the textured surface 169.

The textured surface 169 may be angled as to direct the flow of filtered liquids. The textured surface 169 may be angled towards the drainage point 165, horizontally, vertically, or in any other direction to direct the flow of filtered liquids.

In a preferred embodiment, the textured surface 169 may be a series of shallow ribs which holds the filter medium away from the surface of the funnel and may also enhance material flow during the production process. The textured surface 169 being ribs may support flow through a filter medium that are at least 100% higher compared to a funnel without a textured surface 169.

The assembly sheet 6 may also have a male tab 171 and a female tab 173 forming corresponding parts of a connector. The male connector 171 and the female connector 173 may be located on an edge of one of the sections 161 or on an edge of the tab 164. The male connector 171 and the female connector 173 may releasably engage each other.

The sections 161 and the hinges 167 are oriented so that the drainage points 165 are adjacent to each other, wherein the concave corners of the sections 161 form an opening when the male connector 171 releasably engages the female connector 173. The assembly sheet may form a funnel-shape when the male connector 171 releasably engages the female connector 173.

Figure 7:
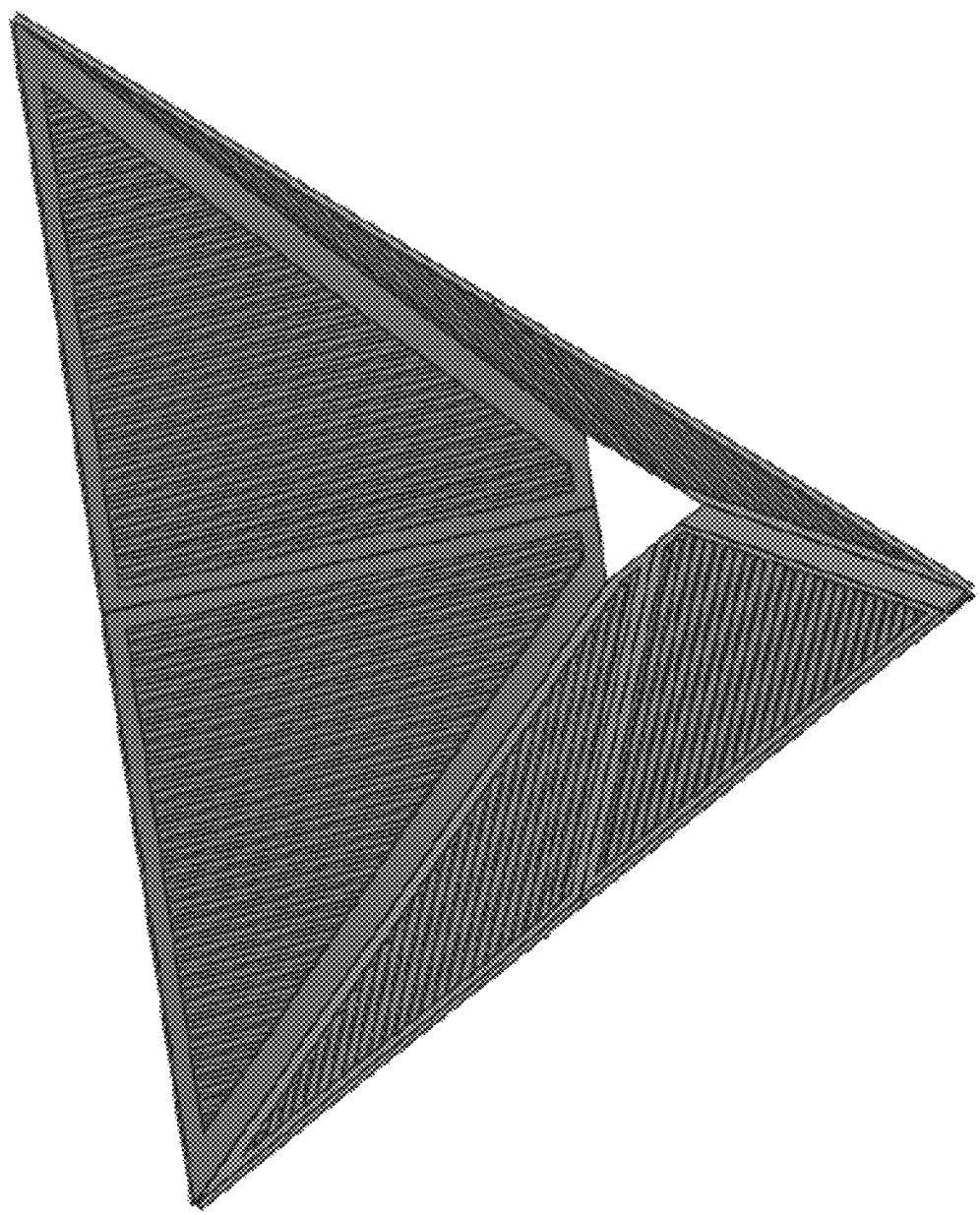
FIG. 7 is an angled top view of a schematic diagram depicting an assembled filter funnel according to the present teachings.

FIG. 7 shows an alternate view of one embodiment of a funnel assembly according to the present teachings.

In one variation of the present teachings, a flat-sheet plastic may be converted into a shallow funnel or folded into a compact form for shipping and handling. In this case, the portion of the assembly web that was folded in accordance with the embodiment shown in FIGS. 1 and 2 during the formation of the funnel and may instead be eliminated and replaced with one or more small tabs that can be configured to permit the two open edges of the assembly to be drawn together and secured by a paper clip, impulse weld, sonic weld, hot melt glue or other similar means. This configuration, when thin foldable living hinges are provided, can continue to be folded into a compact form that is conveniently thin. The choice between the use of a plastic funnel as shown in the embodiment of FIGS. 1 and 2 or the embodiment of FIGS. 5 and 6 relates to the extra step of securing the open ends of the funnel across the tab(s) and the fact that it is possible for fluid to escape the funnel through this gap unless suitably welded, glued, or overlapped and clamped using a device like a stainless-steel paper clip. The plastic funnel formed in embodiment shown in FIGS. 5 and 6 utilizes a solid sheet of plastic and when folded to form the supporting funnel there is no opening or gap that would allow fluid to escape the funnel.

The alternate embodiments demonstrate that there can be variations between the shape of the flat sheet used to form the plastic funnel in comparison to the flat sheet used to form the filter.

Referring now to FIGS. 8A-8D shown is one embodiment for a folding cup according to the present teachings.

The cup 5 may be made up of a single flat sheet piece 52. The flat sheet piece 52 may be made of the same materials and made by the same method as the funnel piece 2.

The cup 5 may have one or more locking buttons 56. The wall 53 of the cup 5 may have a folding tab 55. The folding tab 55 may have one or more male connectors 57 being a part of the locking button 56. The walls 53 may have female connectors 59 being a part of the locking button 56. The folding tab 55 may be connected to the wall 53 by a hinge 51.

In one embodiment the folding tab 55 may have two male connectors 57 and an adjacent wall 53 may have two female connectors 59.

Each wall 53 of the folding cup may be attached to the floor 54 of the cup 5 by a hinge 51. The hinge 51 may be bent such that the wall 53 is perpendicular to the floor 54 of the cup 5. Each wall 53 may be connected to an adjacent wall using the tabs 55 fitted with a locking button 56 forming the cup 5. The cup 5 may be lined with a plastic bag to create a waterproof container.

The locking buttons 56 may be released and the walls 53 of the cup 5 may be folded down to create a compact stack that occupies minimum volume.

FIGS. 8C and 8D show a top down and side view of the schematic for the cup 5. The schematic shows how the cup 5 may be substantially flat in its unfolded state.

In one embodiment FIG. 8C shows dimensional proportions that may be used for the cup 5. For example, the wall 53 may be a square with side lengths of 3.5" and the tab may have a width of 0.75". The walls 53 may be connected to each side of the floor 54. The floor 54 having the same dimensions as the walls 53. The entire cup 5 in its unfolded state may fit with in a 10.5" square.

While the present teachings have been described above in terms of specific embodiments, it is to be understood that they are not limited to these disclosed embodiments. Many modifications and other embodiments will come to mind to those skilled in the art to which this pertains, and which are intended to be and are covered by this disclosure. It is intended that the scope of the present teachings should be determined by proper interpretation and construction of the disclosure and its legal equivalents, as understood by those of skill in the art relying upon the disclosure in this specification and the attached drawings. In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification should be read with the understanding that such combinations are entirely within the scope of the invention.

What is claimed is:

1. A filtration apparatus comprising:
   a funnel having a plurality of base sheets releasably connected to each other, each base sheet having a polygonal shape;
   each base sheet includes:
      two sections connected by a hinge extending along a diagonal from a first corner of the base sheet to a second corner opposite the first corner, the second corner being substantially concave, the first section being foldable towards the second section along the hinge;
      at least one connector having a first part and a second part, the first part of the connector disposed on the first section of the base sheet along a first edge adjacent to the second corner, the first part of the connector comprising a projection that extends away from an upper surface of the base sheet, the second part of the connector disposed on the second section of the base sheet along a second edge adjacent to the second corner, the second part of the connector comprising a depression in a lower surface of the base sheet;
   wherein each base sheet is bent along the hinge; and
   wherein the first part of the connector of each base sheet is configured to releasably engage the second part of the connector of another base sheet such that the plurality of base sheets form a funnel-shape and the concave corners are disposed adjacent to each other to form an opening.

2. The filtration apparatus of claim 1, further comprising a filter received in the funnel such that the filter is arranged against the upper surfaces of the base sheets.

3. The filtration apparatus of claim 2, wherein the filter has a planar form that is foldable into a shape corresponding to the funnel-shape.

4. The filtration apparatus of claim 1, wherein the depression of the second part of the connector forms a corresponding projection that extends away from the upper surface of the base sheet.

5. The filtration apparatus of claim 1, wherein the hinge comprises a ridge or crease formed in the base sheet.

6. The filtration apparatus of claim 5, wherein the hinge comprises a plurality of parallel ridges or creases formed in the base sheet.

7. The filtration apparatus of claim 1, wherein a cross section of the first part of the connector along a plane parallel with the base sheet is defined by a round shape.

8. The filtration apparatus of claim 1, wherein a cross section of the second part of the connector along a plane parallel with the base sheet has a shape of a polygon.

9. The filtration apparatus of claim 8, wherein the cross section of the second part of the connector is a square.

10. The filtration apparatus of claim 1, wherein the upper surface of each base sheet has a series of protuberances configured to direct a flow of material in the filtration apparatus.

11. The filtration apparatus of claim 10, wherein the protuberances are oriented at an angle relative to the hinge.

12. The filtration apparatus of claim 11, wherein the protuberances are linear and are oriented substantially at a 45-degree angle relative to the hinge.

13. A modular structural device for assembling a funnel of a filtration apparatus, comprising:
    a base sheet having a polygonal shape;
    the base sheet having two sections connected by a hinge extending along a diagonal from a first corner of the base sheet to a second corner opposite the first corner, the second corner being substantially concave, the first section being foldable towards the second section along the hinge;
    at least one connector having a first part and a second part, the first part of the connector disposed on the first section of the base sheet along a first edge adjacent to the second corner, the first part of the connector comprising a projection that extends away from an upper surface of the base sheet, the second part of the connector disposed on the second section of the base sheet along a second edge adjacent to the second corner, the second part of the connector comprising a depression in a lower surface of the base sheet;
    wherein the first part of the connector is configured to releasably engage the second part of the connector of a second base sheet.

14. The modular structural device of claim 13, wherein the base sheet has a substantially square shape with the first corner being convex and the second corner being substantially concave.

15. A filtration system comprising:
    a base sheet having a plurality of sections, each section being separated from at least one other of the sections by a juncture;
        each section having two subsections connected by a hinge extending along a diagonal from a first corner of the section to a second corner opposite the first corner, the second corner being substantially concave, the first subsection being foldable towards the second subsection along the hinge; and
    a connector having a first part and a corresponding second part;
    wherein the first part of the connector is attached to one of the sections and the second part of the connector is attached to another one of the sections;
    wherein the first part of the connector is configured to releasably engage the second part of the connector such that the base sheet is bent along the hinges forming a funnel-shape and the concave corners are disposed adjacent to each other to form an opening.

16. The filtration system of claim 15, wherein the plurality of sections of the base sheet are oriented in an L-shaped configuration.

17. The filtration system of claim 15, wherein the juncture is configured to be bent.

18. The filtration system of claim 15 further comprising:
    a folding cup apparatus comprising:
    a base having a polygonal shape;
    a plurality of walls, each wall being connected to an edge of the base by a first joint extending along a first edge of the respective wall;
    each wall having:
        at least one link having a first part and a second part, the first part of the link disposed along a second edge adjacent to the base;
        a tab connected to a third edge of the wall by a second joint, the third edge being opposite the second edge, the tab having the second part of the link disposed thereon;
    wherein each wall is configured to bend towards at least one of the other walls along the first joint; and
    wherein the tab of each wall is configured to bend along the respective second joint such that the first part of the connector of each wall releasably connects to the second part of the connector of one of the other walls adjacent thereto.

* * * * *